US009656271B2

(12) United States Patent
Zhou et al.

(10) Patent No.: US 9,656,271 B2
(45) Date of Patent: May 23, 2017

(54) GUIDED TRANSPORT OF MAGNETICALLY LABELED BIOLOGICAL MOLECULES AND CELLS

(75) Inventors: Yuchen Zhou, Milpitas, CA (US); Yimin Guo, San Jose, CA (US)

(73) Assignee: Headway Technologies, Inc., Milpitas, CA (US)

( * ) Notice: Subject to any disclaimer, the term of this patent is extended or adjusted under 35 U.S.C. 154(b) by 1645 days.

(21) Appl. No.: 11/999,171

(22) Filed: Dec. 4, 2007

(65) Prior Publication Data

US 2009/0139908 A1 Jun. 4, 2009

(51) Int. Cl.

*G01N 1/36* (2006.01)
*B03C 1/033* (2006.01)
*B03C 1/034* (2006.01)
*B03C 1/28* (2006.01)

(52) U.S. Cl.

CPC .............. *B03C 1/033* (2013.01); *B03C 1/034* (2013.01); *B03C 1/288* (2013.01); *B03C 2201/18* (2013.01); *B03C 2201/26* (2013.01)

(58) Field of Classification Search

CPC ......... B01L 2400/043; B01L 3/502761; B01L 2200/0668; B01L 2200/0663; B01L 2300/0819; G01N 2015/1081; G01N 35/0098; G01N 33/54366; G01N 33/54326

USPC .......................................................... 422/50

See application file for complete search history.

(56) References Cited

U.S. PATENT DOCUMENTS 5,523,231 A 6/1996 Reeve
5,691,208 A 11/1997 Miltenyi et al.
6,294,342 B1 9/2001 Rohr et al.
2002/0022261 A1 2/2002 Anderson et al.
2002/0081714 A1* 6/2002 Jain et al. ................. 435/287.2
(Continued)

FOREIGN PATENT DOCUMENTS

WO PCT/US 08/13357 5/2009

OTHER PUBLICATIONS

"Magnetic bead handling on-chip: new opportunities for analytical applications," by Gijs, Microfluid Nanofluid (2004), pp. 22-40.
(Continued)

*Primary Examiner* — Mark Shibuya
*Assistant Examiner* — Pensee Do
(74) *Attorney, Agent, or Firm* — Saile Ackerman LLC; Stephen B. Ackerman

(57) ABSTRACT

Presented herein is a method and devices for identifying biological molecules and cells labeled by small magnetic particles and by optically active dyes. The labeled molecules are typically presented in a biological fluid but are then magnetically guided into narrow channels by a sequential process of magnetically trapping and releasing the magnetic labels that is implemented by sequential synchronized reversing the magnetic fields of a regular array of patterned magnetic devices that exert forces on the magnetic particles. These devices, which may be bonded to a substrate, can be formed as parallel magnetic strips adjacent to current carrying lines or can be substantially of identical structure to trilayered MTJ cells. Once the magnetically labeled molecules have been guided into the appropriate channels, their optical labels can be detected by a process of optical excitation and de-excitation. The molecules are thereby identified and counted.

25 Claims, 12 Drawing Sheets

(56) References Cited

U.S. PATENT DOCUMENTS

| | | | | |
|---|---|---|---|---|
| 2003/0040129 | A1 | 2/2003 | Shah | |
| 2004/0077105 | A1 | 4/2004 | Wu et al. | |
| 2005/0100930 | A1* | 5/2005 | Wang et al. | 435/6 |
| 2005/0170418 | A1 | 8/2005 | Moreland et al. | |
| 2007/0114180 | A1 | 5/2007 | Ramanathan et al. | |
| 2007/0144976 | A1* | 6/2007 | Franzreb et al. | 210/695 |

OTHER PUBLICATIONS

"A biosensor based on magnetoresistance technology," by Baselt et al., Biosensors & Bioelectronics 13 (1998) pp. 731-739, Elsevier.

"A DNA array sensor utilizing magnetic microbeads and magnetoelectronic detection," by Miller et al., Journal of Magnetism and Magnetic Materials 225 (2001) pp. 138-144.

"Towards a magnetic microarray for sensitive diagnostics," by Wang et al., Journal of Magnetism and Magnetic Materials 293 (2005), pp. 731-736, Elsevier.

"Manipulation of magnetic particles by patterned arrays of magnetic spin-valve traps," by Mirowski et al., Journal of Magnetism and Magnetic Materials 311 (2007) pp. 401-404.

"Hall Biosensor With Integrated Current Microstrips for Control of Magnetic Beads," by Kumagai et al., IEEE Transactions on Magnetics, vol. 42, No. 12, Dec. 2006, pp. 3893-3895.

"On-chip antibody handling and detection in a magnetic droplet manipulation system," by U. Lehmann et al., Presented at: MNE 2006, Barcelona, Spain, Sep. 17, 2006, Published in: Abstracts of the MNE 2006 Conference, vol. 32, p. 45-46.

"Isolation of an Untouched DC4+T Cell Population from both Murine Spleen and Peripheral Lymph Nodes using Dynal MouseCD4 Negative Isolation Kit," DYNALogue 2004, Customer Report, Jan. 1, 2004, pp. 14-15, wvvw.dnalbiotech.com.

BD TM IMag Cell Separation System, BD Biosciences, Sep. 1, 2005, pp. 1-12, www.bdbiosciences.com.

* cited by examiner

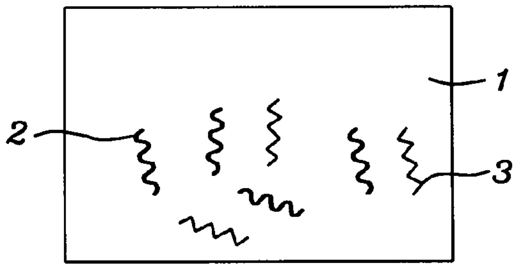
FIG. 1A – Prior Art
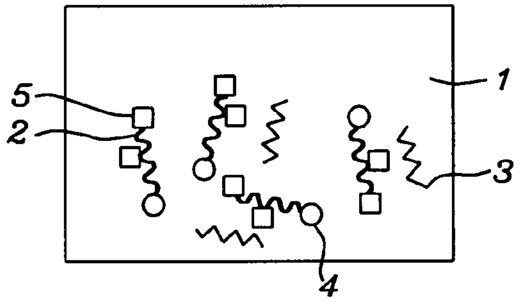
FIG. 1B – Prior Art
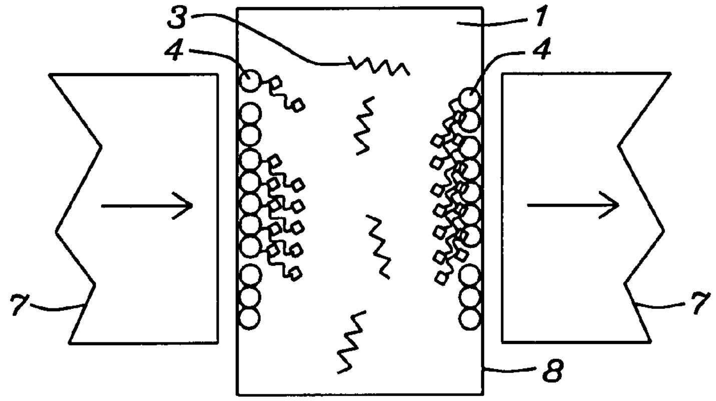
FIG. 1C – Prior Art
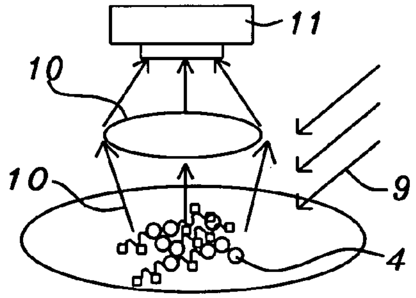
FIG. 1D – Prior Art

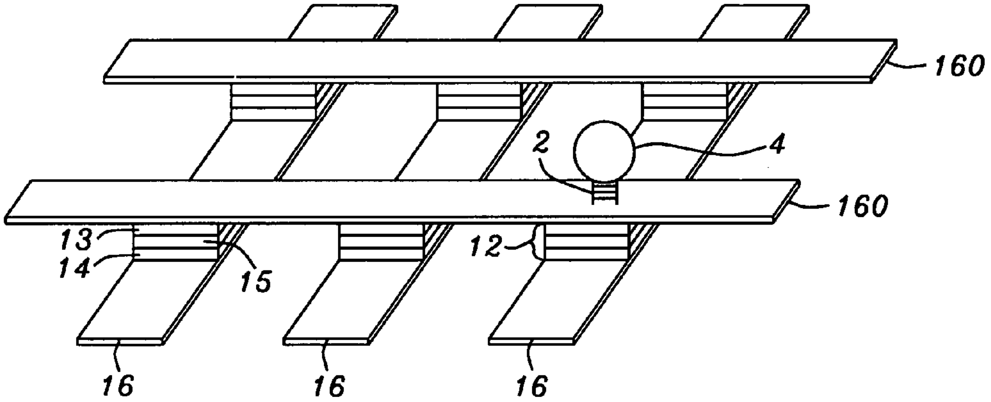
FIG. 2 - Prior Art
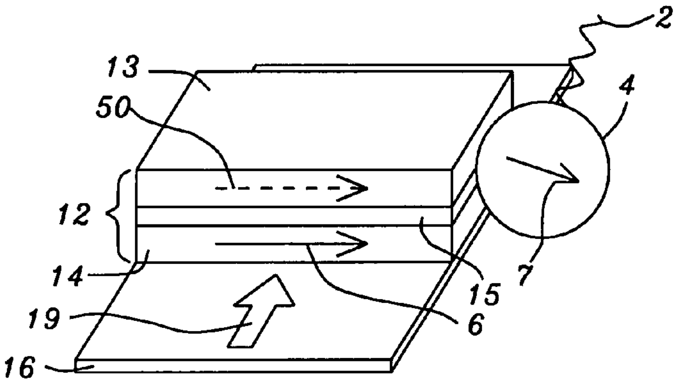
FIG. 3A - Prior Art
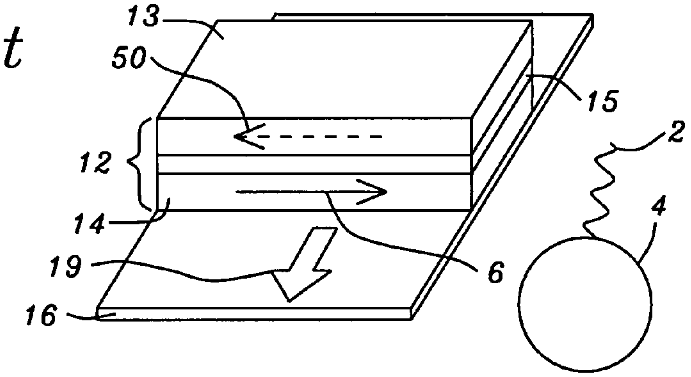
FIG. 3B - Prior Art

GUIDED TRANSPORT OF MAGNETICALLY LABELED BIOLOGICAL MOLECULES AND CELLS

BACKGROUND OF THE INVENTION

1. Field of the Invention

This invention relates to the guided transport of biological molecules or cells to which small magnetic particles have been attached, particularly when such molecules or cells are then to be detected optically in a chemical or biological assay.

2. Description of the Related Art

Physical extraction of biological cells and molecules from liquid biological solutions by exerting magnetic forces on attached magnetic labels (i.e., small magnetized particles) has been a widely adopted technique in medical and biological practice. The biological cells or molecules have magnetic labels attached to them, the labels being very small particles of magnetic material that are magnetizable by an external magnetic field. Such small particles of magnetic material are typically superparamagnetic, meaning that thermal effects are sufficiently large to destroy spontaneous domain formation and, therefore, they must be placed in an external magnetic field to acquire a magnetization. Thus, detection of the target cells or molecules is usually accomplished by applying such an external magnetic field that magnetizes the magnetic labels, exerts a magnetic force on them and extracts them from the liquid-form samples together with the cell and molecule to which they attach. Afterwards, a subsequent reading of, for example, optical signals emitted by fluorescent or luminescent compounds (dyes) previously also attached to the extracted cells or molecules is performed to identify the existence of the target molecules or cells. However, such an ensemble oriented extraction technique is incapable of producing detections at the single molecule level, because the target molecules are detected in the form of concentrated clusters or as droplets where signal scattering by unbound labels or liquid solution can be very high.

Referring to FIGS. 1A-1D, there is shown a schematic illustration of such a prior art method of magnetically extracting and optically detecting magnetically labeled molecules. In FIG. 1A there is seen a biological solution (1) containing the target molecules (2) to be detected and distinguished from molecules that are not of interest (3). FIG. 1B shows the target molecules (2) with magnetic labels (4) and fluorescent dyes (5) attached to them. FIG. 1C shows the fluid (1), passing in a channel (8) between the poles of a magnet (7). Solid arrows indicate the magnetization of the magnet. The magnetic labels have been attracted to either side of the channel by the interaction between the external magnetic field of the magnet and the induced magnetization within the labels, pulling their attached molecules with them. In FIG. 1D there is shown a subsequent identification of the labeled target molecules (4) by means of a beam of excitation light (9) and the optical detection of excitation fluorescence (10) in an optical detection system. (11). M. A. Reeve, (U.S. Pat. No. 5,523,231) teaches a method to isolate macromolecules using such magnetically attractable particles. Similarly, M. A. M. Gijs has published "A Magnetic bead handling on-chip: new opportunities for analytical applications," Microfluid Nanofluid. Pp 22-40, 2004.

The prior art also teaches detection of labeled biological molecules or viruses with accuracy at the level of single molecules by the use of magneto-resistive (MR) sensors. D. R. Baselt et al., "A biosensor based on magnetoresistance technology," Biosens. Bioelectron., vol. 13, pp. 731-739, October 1998, M. M. Miller et al., "A DNA array sensor utilizing magnetic microbeads and magnetoelectronic detection," J. Magn. Magn. Mater., vol. 225, pp. 138-144, April 2001 and S. X. Wang et al., "Towards a magnetic microarray for sensitive diagnostics," J. Magn. Magn. Mater., vol. 293, pp. 731-736, 2005.

Referring to FIG. 2, there is schematically shown how such a prior art system can operate. The technique usually uses a regular array of identical MR sensors, one such sensor being indicated as (12). Each sensor is formed between an intersection of two sets of vertically separated horizontally directed parallel current carrying wires (160), (16) that are orthogonal to each other.

The individual patterned magnetic devices comprise two horizontal electrically conducting planar magnetic layers (13), (14), separated by a non-magnetic layer (15) and the array may be formed by patterning a larger horizontal film deposition of two horizontal planar magnetic layers separated by a non-magnetic layer.

Subsequent to (or prior to) their being patterned into the array of discrete devices (12), the magnetic layers are magnetized and the magnetization of one of the layers (nominally, the "bottom" layer (14)) is fixed in spatial position and may be denoted the "pinned" layer and the magnetization of the other layer (nominally the "top" layer (13)) is allowed to move freely and may be denoted the "free" layer. The direction of the magnetization of each layer is predisposed by providing the layers with some form of magnetic anisotropy, either a crystalline anisotropy that results from the layer deposition process or a shape anisotropy that results from the patterning, or both.

As a result, by a proper choice of currents in the two sets of wires (100), (16), the magnetization of the free layer can be moved and can be caused to be parallel to or anti-parallel to that of the fixed layer. It is well known in the prior art that such sensors display two resistance states according to the relative directions of the two magnetic moments. When the moments are aligned (parallel), the resistance is low and when the moments are anti-aligned (anti-parallel) the resistance is high. Thus, a measurement of the resistance of any element in the array will give an immediate indication of the alignment of its magnetizations. The basic idea is then to magnetize the label of the captured molecule (4) and to have its magnetization switch the direction of the free layer magnetization of the sensor element over which it is trapped. The switching is detected as a resistance change and it gives an indication of a trapped particle.

Typically such an array of sensors is formed beneath a substrate surface (not shown) that is furnished with chemical binding sites that are specific to the molecule or cell being detected. For simplicity of the figure and ease of visualization, a captured target molecule (2) and its attached magnetic label (4) is shown as being bound to one of the conducting lines (160). In practice, the conducting line is beneath the substrate and the molecule is bound to a site on the substrate surface. When such a molecule binds to one of the sites, its label is then in a fixed position over the portion of the sensor array beneath the binding site. In this figure, the molecule (2) is shown as being directly over one of the sensors (12). After the magnetic labels that are not bound to the substrate surface are removed, typically by flushing the surface, the remaining magnetic labels are subjected to an external magnetic field that is perpendicular to the substrate plane, whereupon the labels generate an induced magnetic field (17) that projects into the underlying MR sensor and is parallel to the magnetic layers of the sensor. As already noted above, because the magnetic particles are so small, they are "superparamagnetic", meaning that thermal energy exceeds the energies that would create stable domains, so there is no spontaneous magnetization. Consequently, the particle must be subjected to an external magnetic field so that it may become magnetized and produce its own magnetic field. The surface attachment of the magnetic labels ensures their close proximity to adjacent MR sensors, to enhance the effects of the small magnetic signal they generate. However, this method does require the process of capturing the target molecules on the substrate surface, as well as the removal of the labels that do not have their molecules attached to surface sites. Since label binding to molecule and molecule binding to surface requires two separate incubation processes, this new method is theoretically slower than the conventional optical method in its preparation step, because in the optical identification method a single incubation is enough to accomplish both magnetic label attachment and dye attachment to the target molecules. In addition, the MR signal variation between patterned MR matrix cells can be sufficiently great so that the magnetic labels need to exceed a certain size to achieve acceptable accuracy and repeatability in their detection.

We will note at this point that studies within the prior art have shown that sensor arrays such as those illustrated in FIG. 2, can also be used to move small magnetic particles, rather than to detect them. It was shown in prior arts by E. Mirowski et al., "Manipulation of magnetic particles by patterned arrays of magnetic spin-valve traps," J. Magn. Magn. Mat., vol. 311, pp. 401-404, 2007 and by J. Moreland et al., "Microfluidic platform of arrayed switchable spin-valve elements for high throughput sorting and manipulation of magnetic particles and biomolecules," Moreland, also in US published patent application 2005/0170418, teaches that physical manipulation of a single magnetic particle can be achieved with patterned arrays of magnetic multi-layer thin film structures. The magnetic particles can be trapped by a magnetic pattern and later released from the pattern by switching the magnetization of one of the magnetic layers between different directions. Referring to FIGS. 3A and 3B, there is shown schematically how such a prior art process achieves these objects by an illustration with a single labeled particle and a single trilayered device formed by patterning a multilayered thin film structure.

The patterned device (12) in both FIGS. 3A and 3B includes a free magnetic layer (13) formed of a magnetic material such as CoFe, a non-magnetic inter-layer (15), formed of a dielectric material such as AlOx and a pinned layer (14), formed of material similar to that of the free layer. A single molecule (2) to which is attached a magnetic label (4) is adjacent to the device in FIG. 3A. A switching current (19) $I_{switch}$ in an adjacent electrical line (16) rotates the magnetic moment (50), $M_{free}$ of the free layer so that it is parallel to the magnetic moment (6), $M_{pinned}$, of the pinned layer. The parallel magnetic moments effectively produce magnetic charges on the lateral edges of the device which, in turn, induces a magnetization (7), $M_{label}$, in the label (4). The induction process produces a net magnetic attraction between the lateral edge of the device and the magnetized label, bringing the label to the device and trapping it there.

Referring next to FIG. 3B, there is shown schematically the configuration of FIG. 3A wherein the switching current (19). $I_{switch}$ in the line (16) has been reversed in direction, causing the magnetic moment (5) of the free layer (13) to reverse direction and become antiparallel to the magnetic moment (6) of the pinned layer (14). The lateral edges of the device now have net zero magnetic charge, releasing the label (4) and allowing its induced magnetization to essentially disappear.

In whatever method of detection is used, in order to achieve a speedy detection and counting process at the single molecule level, it is preferable that the biological preparation steps be as simple as possible. For example, the one-step incubation process, as used in the conventional optical method described in FIGS. 1A-1D is regarded as being advantageous compared with the MR assay method as described in FIG. 2.

However, to realize single molecule counting, the biological cells or molecules must be manipulated and detected individually, producing sufficient physical separation to ensure the separate response of each individual molecule in space or in time. This is a basic requirement. The conventional ensemble magnetic label extraction and optical detection scheme illustrated in FIG. 1A-1D will not be able to separate each individual label or molecule, even using state-of-the-art flow-cytometry or micro-fluidics systems. In short, the MR sensing scheme illustrated in FIG. 2 is more likely to accomplish the goal of single molecule detection due to the controllable spatial separation between individual captured molecules that it provides.

U.S. Patent Application 2005/0170418 (Moreland et al) discloses using spin valve elements to trap, hold, manipulate, and release magnetically tagged particles, but there is no disclosure of transporting the particles. The prior art also discloses the following patents. U.S. Pat. No. 5,523,231 (Reeve) teaches magnetic extraction of molecules using magnetic beads. U.S. Pat. No. 5,691,208 (Miltenyi et al) shows magnetic spheres in a lattice format used to separate labeled cells from a fluid. U.S. Pat. No. 6,294,342 (Rohr et al) shows an assay method of binding magnetically labeled particles. U.S. Pat. No. 7,056,657 (Terstappen et al) teaches trapping and releasing magnetically labeled cells, but there is no disclosure of transport.

As noted above, each of the prior art methods, including optical detection and MR sensor detection, has its advantages and disadvantages. None of them provide a robust method of reliably detecting the presence of individual beads. It is the object of the present invention to provide such a method.

SUMMARY OF THE INVENTION

A first object of this invention is to provide a method of detecting the presence of small magnetic particles, particularly when such particles act as magnetic labels by being attached to biological molecules or cells.

A second object of this invention is to provide such a method that is sufficiently sensitive to detect single labeled cells or biological molecules.

A third object of the invention is to provide a method of detecting such presence when such labeled biological molecules or cells are in motion.

A fourth object of this invention is to provide such a method that detects the aforementioned magnetically labeled biological molecules or cells when such biological molecules or cells have been further labeled by one or more optically excitable dyes, whereby the magnetic label attachment and dye attachment comprise a single incubation process.

A fifth object of this invention is to provide a method of transporting and guiding magnetically labeled biological molecules or cells contained in a solution of such molecules or cells so that said molecules or cells can be isolated and detected singly A sixth object of this invention is to provide a method of transporting and guiding magnetically labeled biological molecules or cells contained in a solution of such cells so that said cells can be isolated and detected singly by means of radiation emitted by one or more optically excitable dyes.

A seventh object of this invention is to provide such a method that, in addition allows molecules to be extracted from such a solution and thereby identified optically without the disadvantageous effects of optical diffraction.

The objects of the present invention will be achieved by the use of an array or arrays of patterned multi-layered magnetic devices or of parallel single layer magnetic strips or "stripes" (rectangular layers of magnetic material that are longer than they are wide) that can be activated by adjacent current carrying lines. The strips or the devices will magnetically guide and transport the magnetically and optically labeled biological molecules to positions at which they can be individually counted by optical excitation of attached dyes and the detection of the excitation radiation produced by the dyes. Some of these patterned devices are substantially identical to devices used as sensors in the array of FIG. 2, but as will be further described, they will be operated in the manner described in FIGS. 3A-3B that generates the directed movement of magnetized labels and their attached cells and molecules rather than detecting them.

A. Transport and Guidance of Magnetically Labeled Particles.

This method of magnetic label trapping and release by a patterned magnetic film structure is utilized to transport the magnetic labels together with their attached biological molecules or cells to a desired position for optical detection and to extract the labeled molecules from a biological solution if it is so desired. Once the labeled molecules reach the position of an optical detection device, they can be individually detected and counted.

As noted, the molecules must be equipped with both the magnetic labels that provide their movement and the dyes that allow for their optical detection. This equipping can be done as a one step incubation process, which reduces the complexity of biological preparation. The additional ability to extract the labeled molecules from the solution for optical detection provides a better signal-to-background-noise ratio during detection by eliminating diffraction effects and strong background noise caused by the solution. Thus, the individual molecular transportation realizes the goal of single molecule counting and, finally, because the detection scheme uses a mature optical technique, the entire process is easier to be implemented. In the following we will briefly indicate how the array of patterned devices and alternative arrays of magnetic strips can be used to achieve the desired guidance and transport of the magnetic particles.

Referring next to FIGS. 4A and 4B, there is schematically shown a row of 5 exemplary trilayered devices (two magnetic layers separated by a non-magnetic layer), lettered a-e, each one being identical to the single such device of FIGS. 3A and 3B. The bottom of the pinned layer (14) of each device is contacted by a current carrying line (16) that is directed out of the plane of the figure. Note, into-the-plane currents are denoted by circles with crosses, out of the plane currents are denoted by circles with dots. A protective surface (17) covers the devices. A label (4) and an attached entity with dye molecules (5) is shown trapped between devices d and e by the magnetic field of the parallel magnetic moments (arrows) of both free and pinned layers of device d. The entity is drawn here as an exemplary biological molecule labeled optically by attached dye molecules (5). All the other devices have antiparallel magnetizations of their free and pinned layers and, therefore, have zero net magnetic charge on their lateral edges.

Referring next to FIG. 4B, there is shown the labeled (4) molecule of FIG. 4A now having moved to a new trapping position at device c as a result of the parallel alignment of the pinned and free layer magnetic moments in that device. The previously trapping device d has had the magnetic charge on its lateral edges set to zero by reversing the current (from in, to out, of the figure plane)) in the current carrying line beneath it (16), thereby releasing the label and allowing it to move to device c. Such a process can be repeated sequentially to carry a labeled particle in any direction along an array of such trilayered devices.

The success of the transport process described above requires the label to be able to feel the magnetic field from both the present trapping device and from immediately adjacent ones. Thus, the dimension of the magnetic label is preferably larger than the width of the devices and the device layers are preferably thick. A magnetic label whose size is smaller than or equal to the device width, or devices formed of thin magnetic layers, will not transport the molecules effectively.

To solve the problem of a magnetic label not being able to sense the magnetic field of an adjacent device, and of thereby not moving correctly when it is released by a device presently trapping it, an external field can be used to assist in moving the attached label to the edge of the present trapping device that faces the adjacent device to which the label is desired to be transported.

FIGS. 5A-5D show a schematic sequence of such a vertical field-assisted label transport. A set of x, y, and z Cartesian axes will identify the directions of fields and motions. In FIG. 5A, the magnetic label (4) is initially attracted by the field at the right edge of device d (with parallel pinned and free layer magnetizations) and is itself magnetized (arrow (55) within label (4)) by the edge field of d with a vertical magnetization component along +z direction.

In FIG. 5B, an external magnetic field (100) along −z direction re-magnetizes (55) the label (4) with a −z component and the label moves to left edge of device d to attain a lower magnetic energy.

In FIG. 5C the external field is turned off and a current in adjacent line (16) beneath device c switches the free layer magnetizations of device c to be parallel to that of its pinned layer, while turning off the current beneath device d allows its free layer magnetization to revert to its original state. Thus, device d is now in an anti-parallel (net zero field) orientation and device c is in a parallel orientation. Therefore, the label (4) is released by d and captured by c. In addition, the magnetization (55) of label (4) has now been given a +z direction by the field of device c. Note also that the trapping effect can be understood in terms of the equilibration of the magnetic forces on label (4) or in terms of the minimum magnetostatic energy of the system of label and device.

In FIG. 5D, the same external field is applied and the label is again transported in the negative y direction along the array. This method relieves the requirement of large label size and thick film. The transport direction is also easily controlled by the applied field direction and the sequence of the trapping and release processes of adjacent devices. In this way, trapping and release of the magnetic label is also more reliable.

Besides using a MR sensor-type trilayered film structure of the type illustrated in FIGS. 5A-5D, where the resulting patterned devices have a free layer and a pinned layer, a single magnetic layer structure can also be used. Referring to FIGS. 6A-6D, there is schematically shown an example of such a single layer magnetic structure and an array of such structures. Unlike the multi-layered devices in FIGS. 5A-5D, in FIGS. 6A-6D only one magnetic layer exists and it is formed in the shape of a long strip or "magnetic stripe". The magnetic stripe is assumed to have a relatively strong magnetic anisotropy along its lengthwise direction (x-axis direction) that is perpendicular to the transport route of the labels. Thus, the magnetization of the magnetic stripe is naturally along the x-axis direction if no magnetic field is externally applied. Consequently, there are no magnetic charges on the y-axis layer edges that will generate a field to attract magnetic labels. Label capture is only possible when the current carrying line (16) beneath the magnetic layer carries a current in the +x direction, generating a magnetic field in the magnetic layer (14) and magnetizing it in the +y direction. The strong magnetic anisotropy of the magnetic layer can be achieved by inducing a strong crystalline anisotropy along x-axis direction during layer formation. It can also be achieved by making the layer length along the x-axis much longer than the width in the y-axis direction, so a strong shape anisotropy along the x-axis can arise.

FIGS. 6A to 6D schematically represent exactly the same processes as in FIG. 5A to 5D, except that the trapping and release of the magnetic label (4) is not by parallel or anti-parallel magnetization orientations within a trilayered device, but by means of a current field being on or off in a single magnetic layer (13). The current field is produced by the currents in identical adjacent lines (16). The encircled cross shows a current into the plane. An advantage of this scheme is that the magnetic and electrical structures are simpler and the strength of the magnetic field generated by each film layer can be controlled by the current amplitude.

FIGS. 7A-7D then schematically shows another variation of the single magnetic layer or stripe scheme as in FIGS. 6A-6D. The six magnetic layers (13), denoted a-f, have an intrinsic anisotropy that gives them an easy axis (arrow) along y-axis direction. The spacing between the adjacent strips must be very narrow. At the "release" state, in which there is substantially no net trapping field, all layers are magnetized along the same direction as shown in FIG. 7A. Thus, the magnetic field from one strip's edge charges is compensated by the negative sign edge charges from the adjacent strips. Therefore, the effective field between the strips is close to zero. The magnetic label, (4) with attached entity (5), has no induced magnetization and it is free to move.

FIG. 7B shows that during a trapping state, the strip, d, is magnetized in a reverse direction, or antiparallel to the rest of the strips by a current in the current carrying line beneath it. Thus, the edge charges at the c/d interface (both "negative") and the d/e interface (both "positive") of the adjacent strips produce a net magnetic field, shown with dashed field lines (50), that, in turn, induces a magnetization (55) in the label (4). The advantage of this scheme is that unlike the scheme of FIGS. 6A-6D, after the present patterned strip is switched in magnetization direction, it does not require a current generated field to maintain the switched magnetization. Additionally, during the trapping state, the trapping field is generated by the edge charges from two adjacent strips, c/e and e/d instead of one trilayered device as in FIGS. 5A-5D and one strip as in FIGS. 6A-6D. Thus, the trapping field amplitude and gradient from the pattern can be higher than in previous cases.

Transport of the magnetic label along the patterned array can be accomplished with the same method as in FIGS. 5A-5D and FIGS. 6A-6D with the application of a DC magnetic field. However, due to the closeness of the patterns and higher edge fields in this configuration and the higher edge field between immediately adjacent strips, transport of the label can be made simpler. FIG. 7C shows that after the magnetization of strip c is switched to the same direction as that in strip d the resulting magnetic field (see dashed field lines (51)) produced by the oriented combination of c and d changes the magnetization (55) of the magnetic label (4) and pulls the inductively magnetized label in the −y direction. As shown in FIG. 7D, the magnetization of strip d is then reversed so that it is now in its original state shown in FIG. 7A, the magnetic label has been automatically moved to the left without the aid of an applied field and it is now trapped between strips c and d. Therefore, this scheme simplifies the transport procedures by eliminating an external magnetic field.

Besides transport of each single label as described above, separation of two adjacent labels is equally important in order to ensure enough separation between the labels. E. Mirowski et al., cited above, describes an experimental demonstration showing that when several particles are experiencing the magnetic field from a film stack, they tend to form a chain linked by inter-particle fields and do not separate naturally. Thus, a specific procedure needs to be used to separate any interlinked magnetic labels from one another before their individual transport. Referring to FIGS. 8A-8D there is shown schematically a scheme for separating magnetic labels for individual transport using the patterned trilayer device structure as in FIGS. 5A-5D. An interlinked label chain (only two exemplary labels (4), (41), being shown here) can be separated with concurrent trapping of the magnetic labels by the closest devices. Here, in FIG. 8A, the labels are shown trapped between devices c/d and d/e. This trapping occurs because the magnetization of device c has been reversed to create a trapping field between devices c and d that traps label (4) and also label (41) behind it. In the following sequence the leading label (4) will be transported in a forward direction just as the individual label in FIG. 5 was transported. The difference is that the sequence also allows the trailing label (41) to be kept behind the leading label by being trapped at a location between devices that are behind the forward label (4).

Referring to FIG. 8B there is shown the application of an applied field (100) in the −z direction (large downward arrow). In addition, the magnetization of device e has been reversed to trap (41) between devices d and e. The external magnetic field (100) meanwhile moves (4) to a position between devices b and c.

Referring to FIG. 8C, the external field has been turned off and the magnetization of device c is switched to anti-parallel to release the label (4) while the magnetization of device b has been reversed to produce a parallel orientation of its magnetization and to attract label (4). The magnetization of device e is not reversed, so it continues to hold the other label (41). Referring to FIG. 8D, there is shown the repetition of the process of FIG. 8B, where now the applied field (downward arrow) causes label (4) to move in the −y direction to be trapped between devices a and b. Thus, through this sequential trapping/release process, which is substantially identical to that illustrated in FIGS. 5A-5D, the outermost label (4) can be separated from its adjacent neighbor (41) and transported away from successive elements of the label chain (not shown here) one by one. Thus, individual detection of the target molecule attached to each label can be achieved.

FIG. 9 schematically shows an additional feature that can help maintain single label transport. The label transport is realized within a transport channel bounded by channel edges (17) and (18). A succession of parallel magnetic strips (13) (or, equivalently, trilayered devices) are each contacted from below by current carrying lines (16) that can change the directions of the device or strip magnetizations. The channel has an inside cross-transport-route width between edges (17) and (18) that is larger than the diameter of each single magnetic label (4) and (41). However, the width is also smaller than twice of that diameter. Thus, using a scheme such as illustrated in FIGS. 8A-8D, but applied now to strips or devices, magnetic labels are always transported individually through the channel.

B. Magnetic Label Concentration and Controlled Alignment within Liquid Solution

To apply the single label transport scheme described above in real applications the labels need to be segregated and concentrated within the solution that contains diverse molecules and cells bound with magnetic labels and dyes. In addition, the concentrated labels need to be guided to the transport channel for individual label transport and ultimate optical detection. FIG. 10A schematically shows an example of a label guided transport and concentration structure that will achieve the objects of this invention. The device is a planar solution-confining structure that comprises essentially three regions, a sample pool (500), a concentration region (190) and a transport channel (170). Long magnetic thin film strips (13) are formed beneath the sample pool (500) that contains many labeled molecules (4). A strip in this context is a thin magnetic layer that is significantly longer than it is wide. A currentl carrying layer (not shown) runs beneath the strip to provide field variations. A funnel structure (190) is used to concentrate the magnetic labels at the entrance to the transport tunnel (170). Magnetic labels are captured by the strips (13) beneath the pool and moved from within the solution towards the channel entrance with the same transport mechanism as acts on the labels within the channel. After a label reaches the entrance to the channel (170), it is picked up and transported individually along the channel by substantially identical, though shorter, strips (13) according to the method illustrated in FIGS. 7A-7D and FIGS. 8A-8D.

Referring to FIG. 10B, there are shown a set of three identical parallel channels and funnel structures (as in FIG. 10A) that are exemplary of a multiple channel scheme that could be used to guide labeled molecules to alternative examination positions. The guided transport in each channel can be done using its own array of magnetic strips (13) formed beneath the three channels (161), (162), (163).

It is worth noting that the transport of magnetic labels described above does not require the liquid solution to be within the channel. Thus, the labels can not only be guided away from the sample pool, but they can also be physically separated from the solution during the transport process. For example, labels can be elevated above the sample solution and physically detached from the solution. Optical detection of the labeled molecules can then be performed without diffraction from the liquid and without the interference of unbound dyes within the liquid, thereby yielding a higher signal to noise ratio.

C. Optical Detection of Single Molecules or Cells with Single Label Delivery and Positioning.

With the individual transport of the magnetic label as well as the attached target molecule to the desired final position, optical detection of the target molecules can proceed without the conventional 2D imaging of the entire sample surface or through an amplitude-population correlation that requires obtaining an absolute optical signal whose amplitude correlates with the molecule population. FIG. 11A shows a schematic illustration (magnetic strips not shown) of the optical detection of a single labeled and dyed molecule (187). A source of appropriately filtered optical excitation (22) of the dyed molecule transmits its radiation through a narrow region of the channel (170) where it impinges upon a single labeled molecule (187) and the radiation emitted from the excited dye molecules attached to the target molecules enters the optical detector (11) through a secondary optical filter that eliminates the light that caused the optical excitation. The detector, in this configuration, is located at the opposite side of the channel from the source, but it can also be on the same side.

FIG. 11B schematically shows a typical electrical signal produced by the radiation impinging on the optical detector. The vertical axis refers to the signal intensity, the horizontal axis refers to time. When no labels pass between the source and detector, there will be a nominal signal generated by the arrival of the filtered light from the source (90). The passage of a label between source and detector will block the source radiation and the signal might dip slightly (95). When the signal radiation excites the dye on the molecule, there will be a stimulated optical emission that will show up as a peak in the signal (97). If source and detector are on the same side of the channel, the absorption dips (95) may be replaced by slight peaks from label reflection that would be significantly lower than the peak produced by the stimulated emission of the dye (97).

Compared with conventional optical imaging or detection schemes, this method can utilize a highly focused excitation light and narrow-field-of-view optics, including fiber-optics, that will produce little background interference. In addition, since molecules are individually detected, the counting of molecules is not by signal amplitude, but by the number of dye emission peaks in the signal. This further enhances sensitivity and provides stability against noise.

BRIEF DESCRIPTION OF THE DRAWINGS

The objects, features, and advantages of the present invention are understood within the context of the Description of the Preferred Embodiment as set forth below. The Description of the Preferred Embodiment is understood within the context of the accompanying figures, wherein:

FIGS. 1A-1D (prior art) are a schematic representation showing how magnetic labels can be used to attach to biological molecules in a liquid and the molecules can be extracted from the liquid by a magnetic field afterwards for optical detection.

FIG. 2 (prior art) is a schematic representation of a magnetoresistive (MR) sensor matrix on which a labeled biological molecule has been bound.

FIGS. 3A-3B is a schematic illustration of an MR type magnetic trilayer structure being used to capture and release a labeled biological molecule.

FIGS. 8A-8D is a schematic illustration showing a method of detaching a pair of labeled molecules and their transport along an array of patterned magnetic devices.

DESCRIPTION OF THE PREFERRED EMBODIMENTS

Figure 4A:
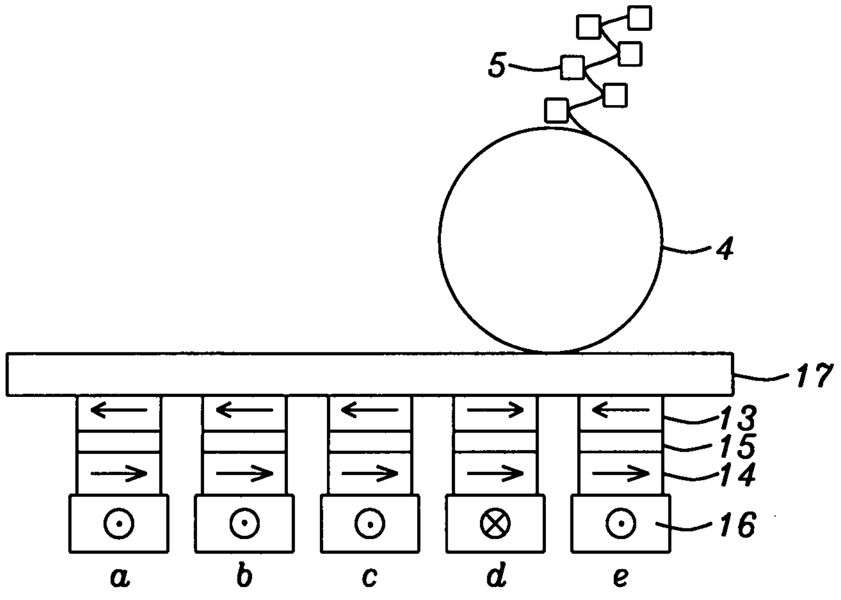
FIGS. 4A-4B is a schematic illustration of a labeled biological molecule being transported along an array of magnetic trilayer structures of the type illustrated in FIGS. 3A-3B
Figure 4B:
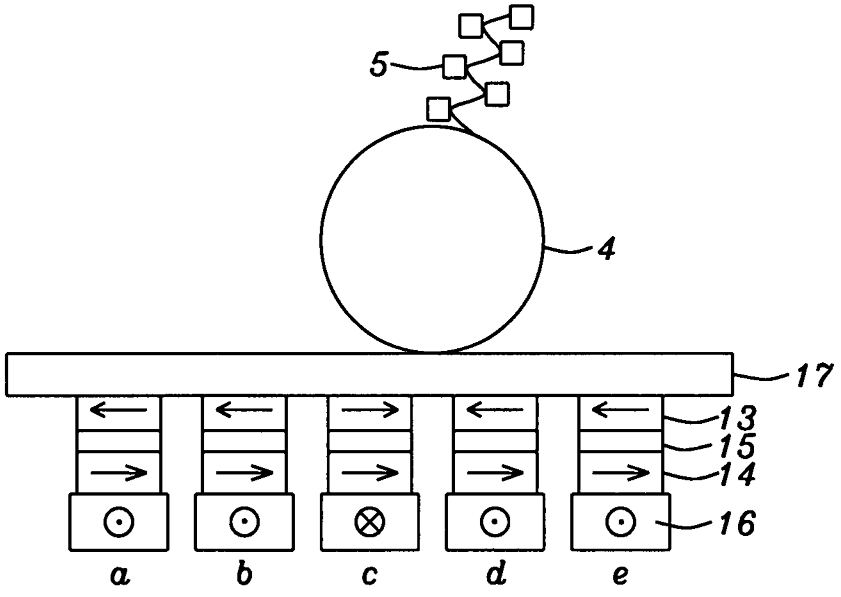
Figure 5A:
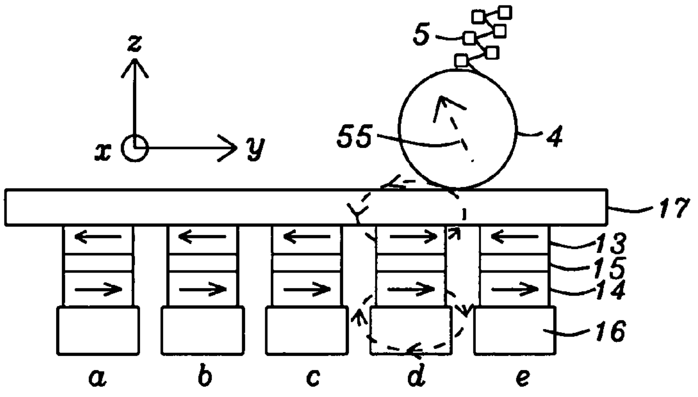
FIGS. 5A-5D is a schematic illustration of the transport of a labeled molecule along an array of magnetic trilayered structures in the presence and absence of an external magnetic field.
Figure 5B:
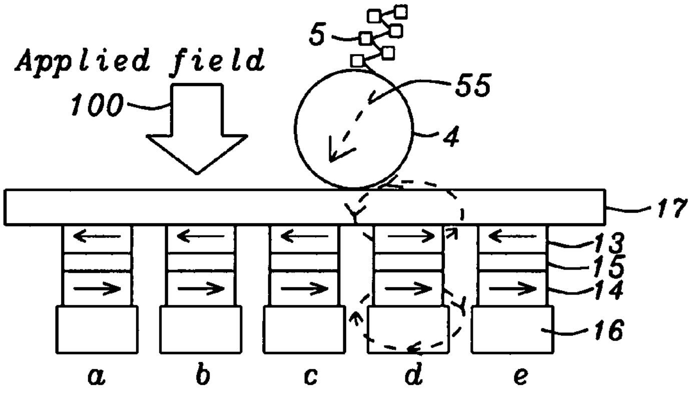
Figure 5C:
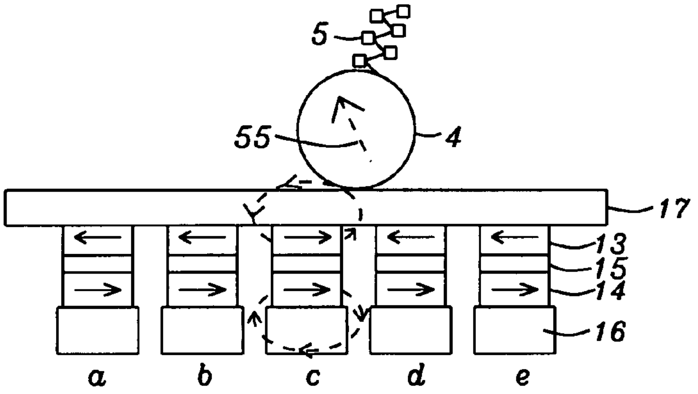
Figure 5D:
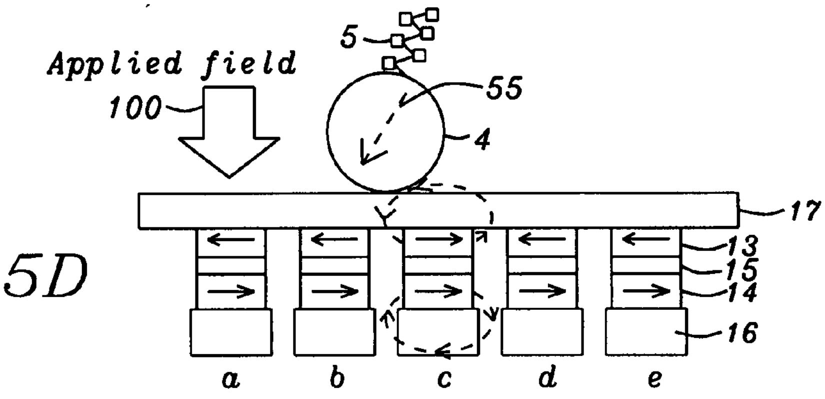
Figure 6A:
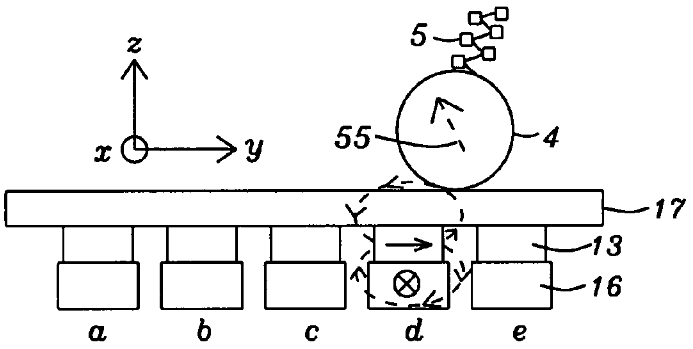
FIGS. 6A-6D is a schematic illustration of the transport of a labeled molecule along an array of single layered magnetic structures whose intrinsic anisotropy field is in the layer plane and perpendicular to the transport direction. The transport is produced in the presence and absence of an external magnetic field.
Figure 6B:
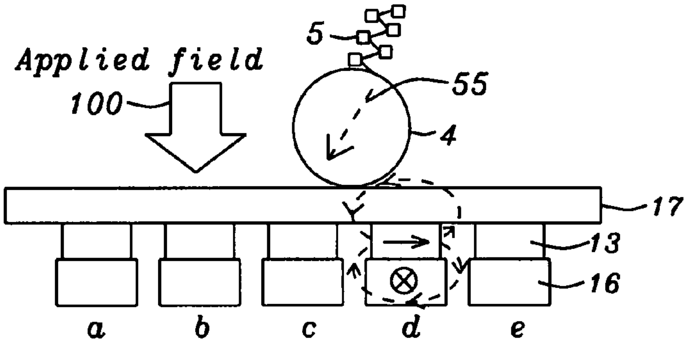
Figure 6C:
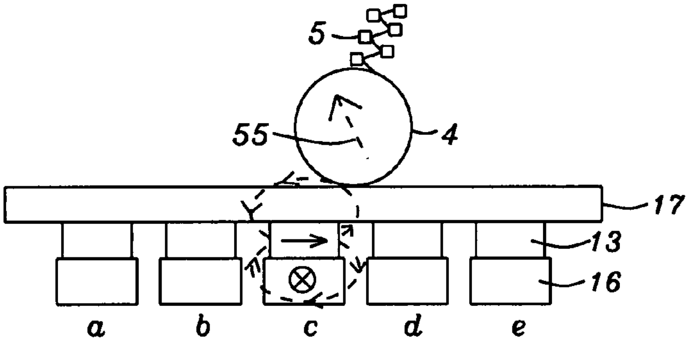
Figure 6D:
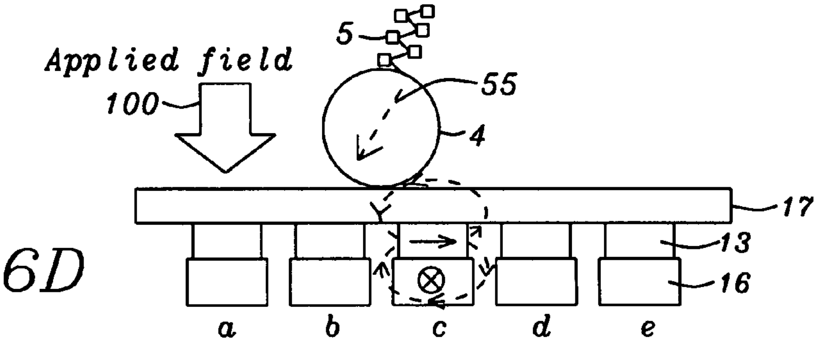
Figure 7A:
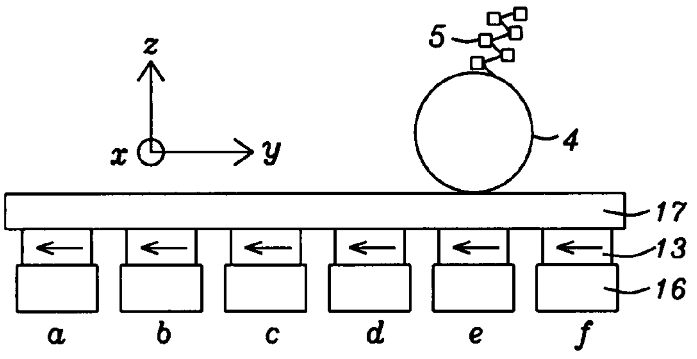
FIGS. 7A-7D is a schematic illustration showing the continual transport of a labeled molecule along an array of single layer magnetic structures, whose intrinsic anisotropy field is along the transport direction, with and without the aid of an external field as in FIGS. 6A-6D.
Figure 7B:
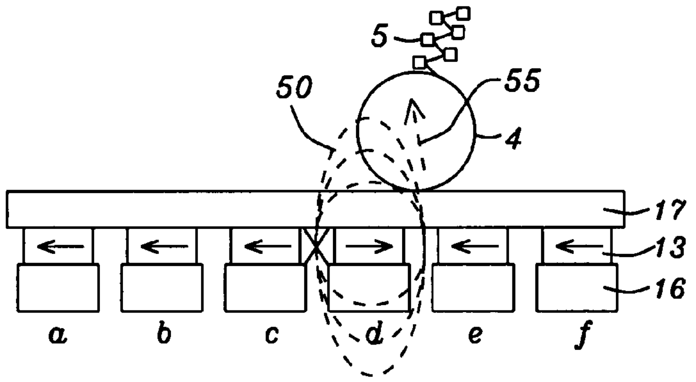
Figure 7C:
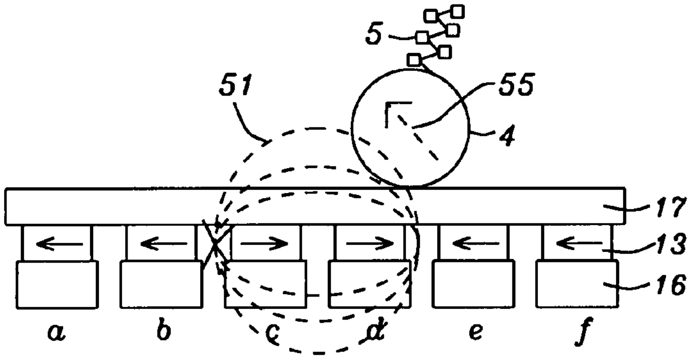
Figure 7D:
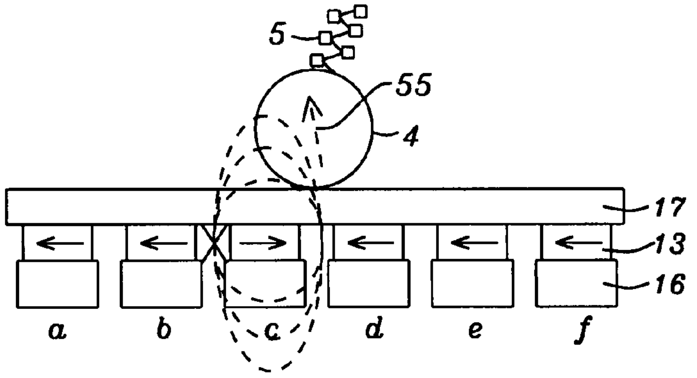
Figure 8B:
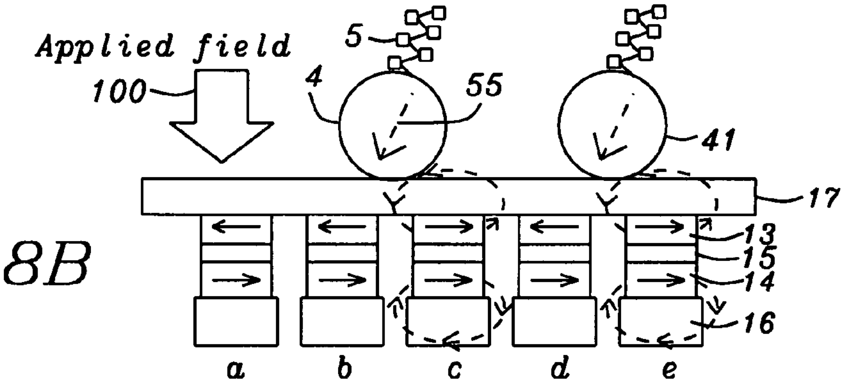
Figure 8C:
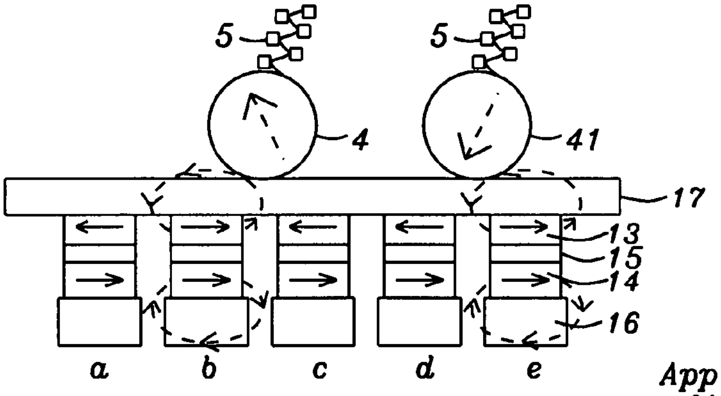
Figure 8D:
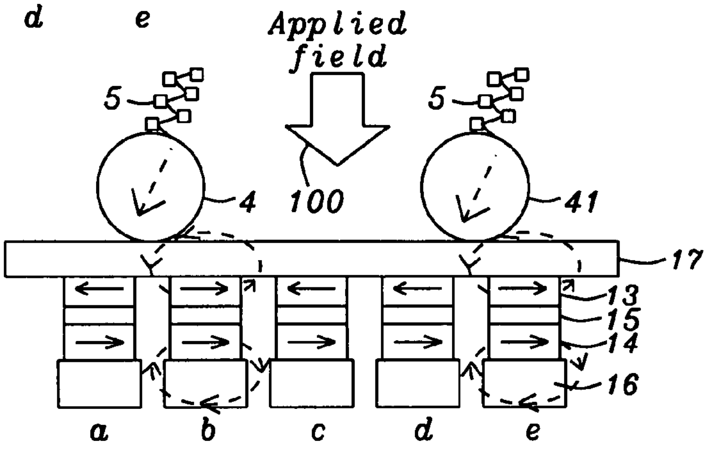
Figure 9:
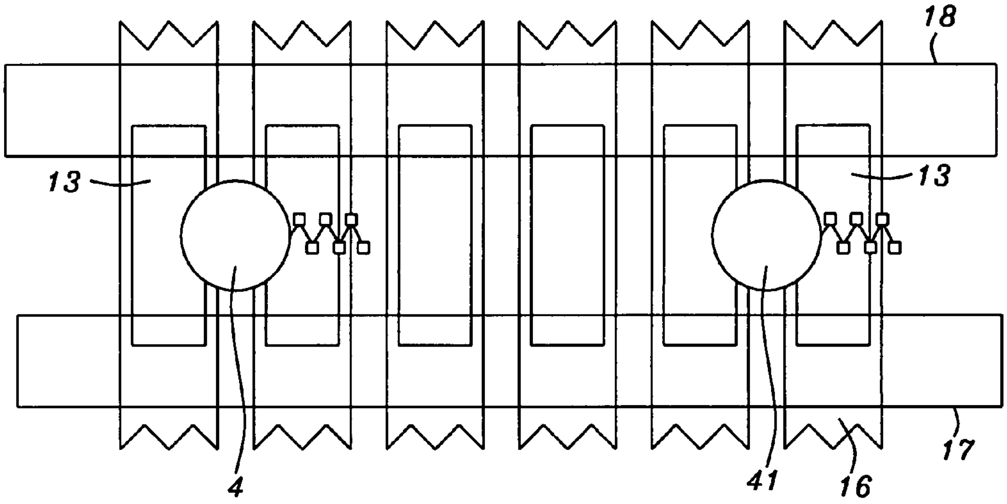
FIG. 9 is a schematic overhead view of labeled molecules being transported along a channel.

The preferred embodiments of the present invention are devices for attracting, transporting and guiding small, typically superparamagnetic, magnetic particles and a method for using those devices to detect and count individual entities to which such magnetic particles are attached and on which, thereby, they act as magnetic labels. The magnetically labeled entities are preferably biological molecules or cells and a guidance and transport method using sequential trapping and release of the magnetic labels by an array of patterned magnetic structures will be disclosed.

The method of magnetic particle guidance and transport by a process of sequential trapping and release by a patterned magnetic film structure, such as that to be described in the following embodiments, can be utilized to form a biological assay where the target biological molecule or cell is individually manipulated and detected. First, through incubation processes, magnetic labels and optically excitable fluorescent dyes or self-luminescent chemical compounds are attached to the target entities, which are preferably molecules and cells. Then, a solution of such prepared molecules and cells with their attached magnetic labels and dyes are introduced into a confinement device within which the solution is held while the magnetically labeled cells or molecules are manipulated. This manipulation includes the individual capture of the magnetic labels by patterned magnetic devices and transported, through a sequential trapping and release process, over an array of the patterned magnetic structures formed beneath the confinement region. The array of patterned devices can be rectangle-shaped single layer magnetic strips, strips having other more or less regular geometrical shapes, or more complex patterned multi-layered magnetic devices such as magnetic trilayer devices, all of which are current activated. Before transport, the magnetic labels (and their attached biological molecules and cells) to be transported are concentrated by being guided through a funnel shaped region into a narrow, linear transport channel. There, the magnetic labels are transported one at a time and physically separated from each other, so that the individual labeled cells or molecules to which they are attached can be optically detected with less interference. In this way, the magnetic labels together with the bound molecules can be extracted and transported away from the original solution location and optically detected with single molecule or single cell level separation and accuracy.

Compared with conventional magnetic cell or molecule extraction and optical imaging or sensing techniques, this method enables single cell or single molecule detection. This method does not rely on fluidics to manipulate biological entities but uses more precisely controlled magnetic forces to guide single magnetic labels. In the detection process it does not rely on 2D imaging that incorporates too much background interference that limits the sensitivity level. Neither does it rely on optical signal amplitude correlation with the target population. With individual label transport, signal detection can be achieved by peak pattern recognition. For the case of one-to-one correlation between the transported label and the attached molecule, counting of molecules is nearly independent of the optical signal amplitude variations.

The advantage of this method compared with conventional 2D MR sensor assay method of FIG. 2 is that the present method does not require a capture process of the target molecules to the assay surface. It also avoids the necessity of a later removal of unbound magnetic labels. Thus, the biological preparation procedures before detection are reduced.

Besides, conventional optical method due to its mass sample detection of the optical signal, it is more accurate for cell applications, where the biological entity is relatively larger and can have many dye molecules attached to a single cell surface to produce significant signal. For molecule detection, optical signal from the dyes attached to the target molecules can be easily blocked by the larger magnetic labels. The MR sensor assay, on the other hand, prefers molecule level application. It requires proximity of magnetic label to the MR sensor to produce enough magnetic field. It also requires strong binding force between the captured entities and the assay surface so that that entities are not removed during unbound label removal process. Since cells are large in size, the magnetic force or flow force during the removal process may cause the binding to easily break.

In the embodiments of this invention, both biological cell detection and molecule detection can be readily adopted with little modification. For cell detection, the channel width needs to be larger than the size of a transport unit (a single cell coated by magnetic labels), but smaller than twice the size. For molecule detection, the transport unit is then a single label.

The embodiments to be described assume functional and commercially available magnetic labels that can satisfy non-agglomeration at zero field, can be magnetized and can be successfully coated with necessary biological or chemical compounds. Such elements have been successfully used in other prior art inventions. The transported unit in the embodiments can be magnetic labels attached with one or multiple biological molecules or cells coated with magnetic labels. Other entities to which magnetic labels can be attached can also be guided and transported by this invention. All necessary protection layers and coatings that enable the patterned multi-layer magnetic thin film structure to function in the relevant biological or chemical environments are assumed.

The Embodiments of this Invention Provide

1) A patterned magnetic thin film structure or device controlled by current induced magnetic fields to trap and release magnetic labels.
2) A method to transport a magnetic label across an array of the patterned devices through sequential trapping and releasing of the label with or without the aid of an external field.
3) A method to separate magnetically coupled labels for separate transport.
4) A label collection and guided concentration method utilizing the trapping and release mechanism within a funnel-shaped structure.
5) An optical signal detection method that uses peak pattern recognition.

Given the five aspects of the embodiments described above, the embodiments of this invention will be separated into five categories in terms of their 1—Trapping Structure,
2—Transport Method,
3—Label Separation,
4—Label Collection and Guided Concentration,
5—Signal Detection.

Thus, the possible structures can be any arbitrary combination of any sub type embodiment within the five categories listed.

1—Trapping Structure

Trapping and releasing of magnetic labels is through the edge field from the lateral edges of the patterned magnetic thin film structures. This edge field can be turned on and off by switching the corresponding magnetic layer magnetization to different orientations. Switching of the magnetic layer is preferably produced by, but not limited to, a magnetic field generated by an electrical current flowing close to the patterned films. The existence of a trapping field can also be described in terms of "magnetic charges," on the faces of such lateral edges. Such charges are an alternative mechanism for describing the effects of a magnetization divergence within a region and can be pictorially thought of as an accumulation of arrow heads or tails within a closed surface.

Embodiment 1A

Figure 12A:
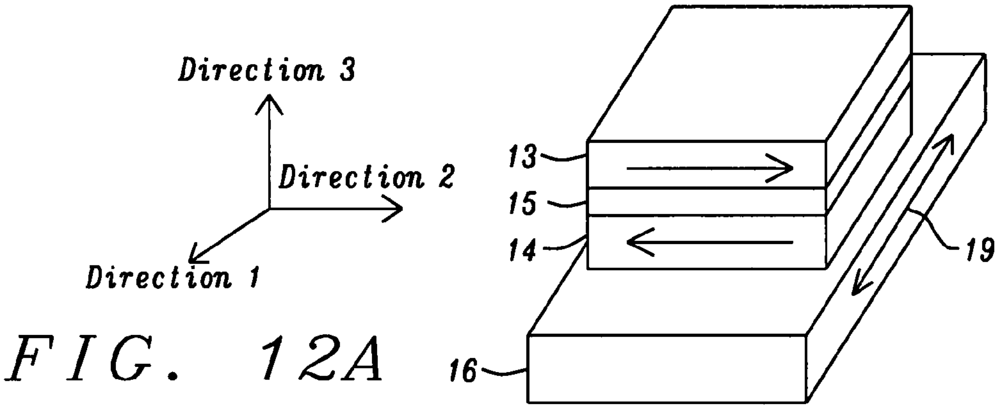
FIGS. 12A-12D are schematic illustrations of four embodiments of the invention associated with different configurations of the patterned magnetic trapping devices.

The trapping structure (also denoted a "device"), shown schematically in FIG. 12A, is formed beneath a protection layer that is not shown here. The term"trapping" as used herein refers to the capture and holding of a magnetized label in a substantially fixed position.

The magnetic labels are attracted by the magnetic fields of the trapping structure and they move against the protection layer's top surface which can be the bottom surface of a confinement device as will be illustrated below. The labels are transported along the top of the protection layer along a Direction 2 as indicated on the Cartesian coordinate system in the figure. The trapping structure is a multilayered device that includes four parts, a magnetic free layer (13), a non-magnetic spacer layer (15), a magnetic pinned layer (14) and a current conduction path (16) that can carry current (19) in either direction along Direction 1 as shown by the double-headed arrow. Free layer (13) magnetization can be in either orientation along Direction 2. Spacer layer (15) serves to break the magnetic exchange coupling between the free layer (13) and pinned layer (14). Pinned layer (14) magnetization is pinned also along one orientation in Direction 2 (shown negative) and not easily switched by an external field. The Direction 2 pinning field in layer (14) can be created by a strong anisotropy field of the material forming layer (14), or from exchange coupling with an antiferromagnetic layer (not shown in this illustration, but which can be a part of the pinned layer) that would contact layer (14), or from a synthetic anitferromagnetic (SAF) structure connected to layer (14) (also not specifically shown, but which can be a part of the pinned structure). These methods are generally known in the art of making MR sensors and will not be described further herein.

It is noted that the patterned trapping structure can have a horizontal cross-sectional shape of any of a wide variety of geometrical forms, such as rhomboids, trapezoids or other quadrilaterals. FIG. 12E shows an overhead view of an alignment of the structures in FIGS. 12A-12D if the horizontal cross-sectional shapes of the free layer (13) were square, trapezoidal or rhomboid. In order to produce strong edge fields capable of trapping magnetic labels, it is preferable that adjacent patterned magnetic structures have facing parallel edges, but such parallelism between immediately neighboring structures can be accomplished by a variety of cross-sectional shapes that have straight edges but are not necessarily parallel to corresponding edges within the same structure. For ease of visualization and explanation, the exemplary shape that will be referred to herein and which is pictured in FIGS. 12A-12D is rectangular.

Electric current (19) flows in a current path along (16) within its plane. Direction 1 is perpendicular to Direction 2. The field generated by current (19) switches free layer (13) magnetization into the same or opposite orientation to the positive direction of Direction 2. During a trapping state, free layer (13) magnetization is switched to the same direction as the magnetization of pinned layer (14). During a release state, free layer (13) magnetization is switched opposite to that of pinned layer (14).

Embodiment 1B

Figure 12B:
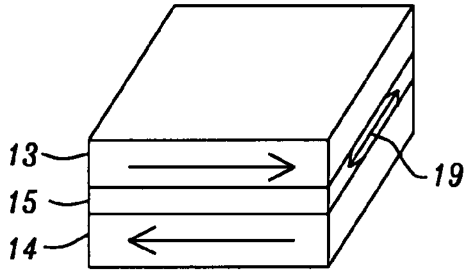

Referring to FIG. 12B, there is shown schematically a device that is the same as that in FIG. 12A except that the adjacent current carrying line ((16) in FIG. 12A) is absent and the current (19) is carried by the interlayer (15).

Embodiment 1C

Referring to FIG. 12C, there is again shown schematically a trapping structure that would be formed beneath a protection layer. The magnetic labels would be attracted against the protective layer by the trapping structure beneath the layer. The trapping structure includes two parts, a single magnetic layer (13) and a current conduction path (16). The natural or normal magnetization of layer (13) is maintained by an internal field along the in-plane Direction 1 that is perpendicular to Direction 2. The internal field of layer (13) can be from any one of, or a combination of crystalline anisotropy, shape anisotropy and stress-induced anisotropy. The internal field in layer (13) can also be due to an exchange coupling with an adjacent antiferromagnetic layer (not shown) or from a SAF structure (not shown) as discussed above. Electric current (19) flows within current carrying layer (16) along Direction 1 and generates a magnetic field to induce a Direction 2 magnetization component in layer (13). Although the magnetization of layer (1) is shown along Direction 1, the current in layer (16) would also induce a Direction 2 component. During the trapping state, layer (13) magnetization would be magnetized by the current field of (16) to have a Direction 2 magnetization component and thereby create surface charges on the Direction 2 (lateral) edges. During the release state, the current generated field of (16) is turned off and layer (1) magnetization loses the Direction 2 component and is once again completely aligned with Direction 1.

Embodiment 1D

Figure 12C:
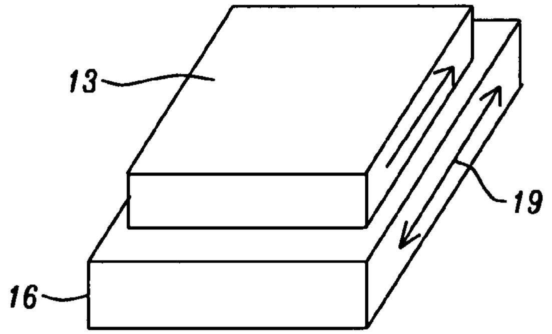
Figure 12D:
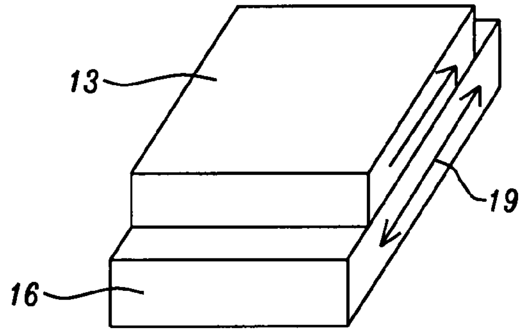
Figure 12E:
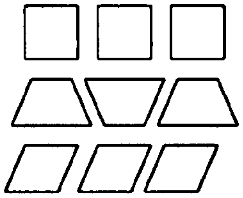
FIG. 12E shows an overhead view of the structures in FIGS. 12A-12D with different horizontal cross-sectional shapes.

Referring to FIG. 12D there is shown schematically a trapping device that is materially and geometrically identical to that in FIG. 12C with the important difference that the magnetization of layer (13) remains fully aligned with Direction 2 during both the trapping and release states. Electrical current (5) flows in current path (4) along Direction 1 and generates a magnetic field to switch the magnetization direction of layer (1) between the two orientations of Direction 2. The magnetization of layer (1) is pinned along Direction 2 by one or a combination of crystalline anisotropy, shape anisotropy, stress induced anisotropy or by a constant current (5) induced field. The pinning field can also be supplied by exchange coupling to an antiferromagnetic layer beneath the layer (1) or from a SAF structure (neither being shown). During the trapping state, layer (1) magnetization of every patterned device is in the same direction except for the particular patterned device that traps the magnetic label. That trapping device has its magnetization switched in a direction opposite to that of its immediately adjacent device. During the release state, all device magnetizations are identical.

2—Transport Method

Embodiment 2A

The physical entities that are transported can be magnetic labels attached to single or multiple molecules or cells. They can also be cells coated with molecules that are themselves attached to multiple magnetic labels. Because of the variety of molecule and cell combinations that can be successfully attached to magnetic labels, we will simply refer to the objects being transported as "test units" for the following descriptions.

Figure 10A:
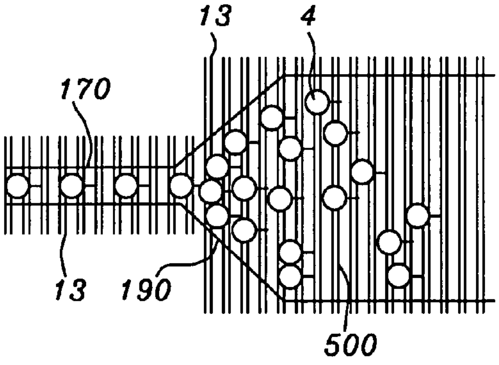
FIGS. 10A-10B are schematic overhead views showing how a solution containing many labeled biological molecules can be concentrated by being guided, transported and funneled along a single channel or multiple channels.
Figure 10B:
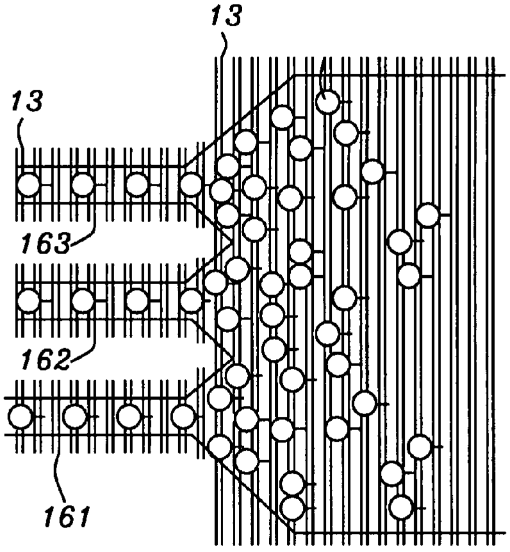
Figure 13A:
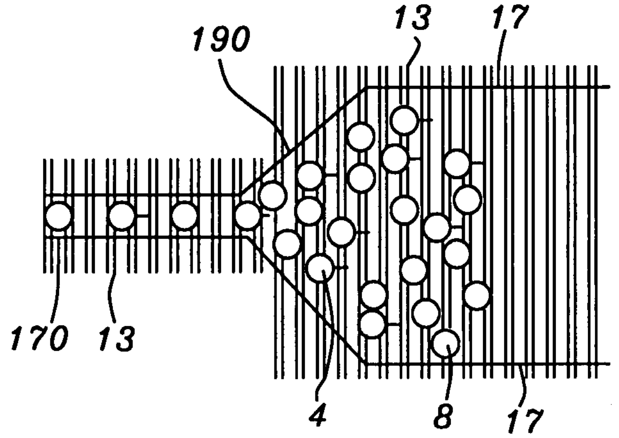
FIGS. 13A-13B are schematic illustrations showing two different embodiments of the invention associated with channeling and transport configurations of patterned magnetic trapping devices.

The transport of a test unit is preferably, but not limited to, one unit at a time. Transport of the test unit in a given direction is achieved by a spatially separated array of the trapping structures described in FIGS. 12A-12D as embodiments 1A-1D respectively, with the arrays aligned so as to produce transport of a test unit along the given direction or transport route. Referring to FIG. 13A there is shown schematically a simple configuration for test unit transport substantially identical to that in FIG. 10A. An array of parallel magnetic strips (13) or patterned devices such as any of those shown in FIG. 12A-12D are arranged under the sample pool defined by the confining edges (17) of the sample pool region. The transport channel is also defined by edges (170) in this embodiment (but it need not be) and a parallel array of strips (13), like strips, is formed under the transport channel. The lengths of the strips under the pool and the channel can be different.

Transport of the test units is preferably through the transport channel (170), which has a length along the transport route significantly longer than the unit size and a width perpendicular to the transport route larger than the size (eg., a diameter) of a single unit but smaller than twice that size. The trapping patterns (i.e. the patterned magnetic structures as described in FIGS. 12A-12D and with possible shape variations of FIG. 12E) lie beneath the channel with Direction 2 being locally along the route direction for each trapping pattern.

Transport may also be accomplished without the use of a confining channel structure when the cross-route direction trapping pattern width can be adjusted to be small enough to confine one test unit for transport per unit of time. A larger cross-route width of the trapping pattern allows for more test units in such a given time.

Embodiment 2B

Transport of the test units along the array of patterned structures is realized by sequential trapping and releasing of adjacent trapping patterns in the direction of the transport and, in addition, the transport of the test unit is assisted by a temporarily applied external field. When one test unit is trapped by a trapping pattern edge (i.e. the edge of a patterned device that is magnetically oriented to create a trapping situation) an applied magnetic field magnetizes the label or labels attached to the unit so that the unit moves to an adjacent edge of a trapping pattern that provides the unit with a lower magnetic energy. It is noted that the condition of a trapped label can be viewed energetically as being in a position of minimum local magnetostatic energy of the system of label-array. The applied external magnetic field assists in moving the label towards such an energy minimum. By making the adjacent edge towards which the external field moves the label the same edge as that to which the label is to be transported next, when the original trapping pattern is placed in a release state (by resetting its magnetization) and the external field is turned off, the unit moves more easily to the neighboring trapping position with better repeatability.

3—Label Separation by Trapping Pattern

To separate chained magnetic labels by the application of trapping fields, when a first test unit is trapped by a trapping field and where other nearby magnetic labels are chained to that test unit by inter-label magnetic forces, the immediately adjacent label on the second test unit can be made to experience a trapping field from another, more distant array site. This trapping of the second test unit, as shown in FIG. 8A-8D can enable the first test unit to be separated from and transported away from the remaining chained units.

Embodiment 3A

By maintaining the trapping mode of the sites on which the chained test units that are not to be transported are trapped (the chained units being the ones from which the first test unit is to be separated), separation of the first test unit from those chained units and transport of the first test unit towards the target site can be realized by sequential trapping and releasing of the adjacent trapping patterns in the direction of transport. With the site pattern neighboring the first test unit being the target site to which the first test unit is being transported, and with that neighboring site being first turned on to its trapping state and then with the trapping field that currently traps the first test unit being turned off (placed in its release state), the first test unit will move to the neighboring site due to the magnetic field that the unit experiences from the neighboring sites.

Embodiment 3B

By maintaining the trapping mode of the sites on which the chained test units that are not to be transported are trapped (the chained units being those from which the first test unit is to be separated), separation of the first test unit from those chained units and transport of the first test unit towards the target site can be realized with the assist of a temporarily applied external magnetic field. The applied field magnetizes the magnetic labels within each unit so that the first unit and the chained second units move to the lowest magnetostatic energy edges of the trapping patterns that are trapping them. Since the remaining units of the chain are all attached to the immediately adjacent second unit, by making the lowest energy edge where the first unit is being trapped in the presence of the external field, the edge facing the neighboring pattern to which the unit is to be transported next, the unit will experience a higher field from the neighboring pattern when the neighboring pattern is in its trapping state. When the pattern trapping the first unit is placed in its release state and the neighboring pattern is placed in a trapping state and the applied field is turned off, the first unit moves to the neighboring trapping pattern and can then be transported away from the remaining units of the chain.

4—Label Collection and Guided Concentration

Embodiment 4A

Referring again to FIG. 13A, there is shown schematically a liquid-form biological sample solution containing test units, which are labeled biological entities (4) to which magnetic labels are attached. The solution may also contain unattached labels (8). This solution is deposited into a planar but confined sample pool (17). The sample pool (17) has a funnel-shaped structure (190) which is denoted a concentration region. This region may or may not be tapered, although it is shown here with the funnel shape. The funnel structure leads to a narrow transport channel (170) within which test units (4) and unattached labels (8) are transported. The sample pool, the funnel structure and the transport channel all have bottom surfaces for confining the solution. Typically, they also have edges along their perimeters to assist in confining the solution. As already noted, however, the channel region need not have confining edges.

Beneath the bottom surface of the channel is an array (13) of parallel trapping structures which may be an array of parallel, closely spaced patterned magnetic thin film strips underlaid with current carrying leads or other devices and structures of the type previously discussed. Beneath the bottom surface of (17) and (190) there are also arrays (13) similar to those under the channel, but of greater length than those under the channel so as to stretch across the width of (17) and (190). Thus, when (13), beneath (190) is switched to a trapping state at an appropriate location, it attracts test units from the solution pool. With a continuous application of sequentially switched trapping states, the test units can be progressively moved from the pool (17) into the funnel shaped region (190) and finally into the channel (170), where they move along on a one-by-one basis.

Embodiment 4B

Figure 13B:
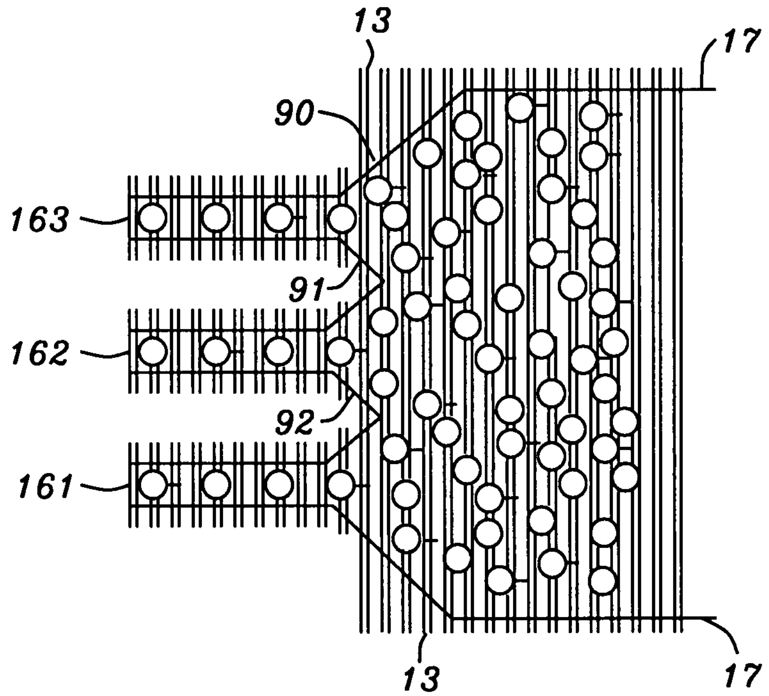

Referring to FIG. 13B, there is shown schematically a system of multiple funnel shaped structures (90), (91) and (92), each identical to the single structure of FIG. 13A and each terminating into its own transport channel (161), (162), (163). A common set of patterned trapping structures (13) traverse the bottom surfaces of the structures and permits a synchronized transport of test units towards the channels. Beneath each transport channel is a patterned set of trapping structures like (13) that can be independently activated so that transport within each channel is parallel and independent.

5—Signal Detection and Sample Sorting

Embodiment 5A

Figure 11A:
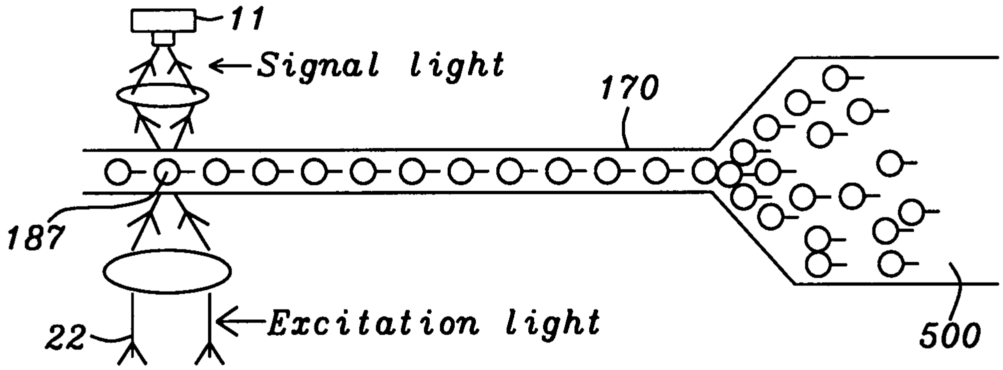
FIGS. 11A-11B is, in 11A a schematic illustration of optical detection of labeled biological entities being transported along a channel and in 11B a schematic illustration of an optical signal waveform generated by the detection process shown in 11A.
Figure 11B:
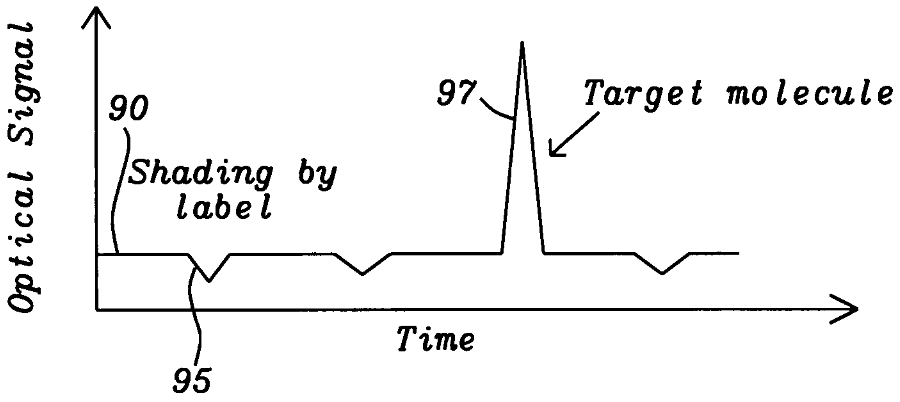
Figure 14A:
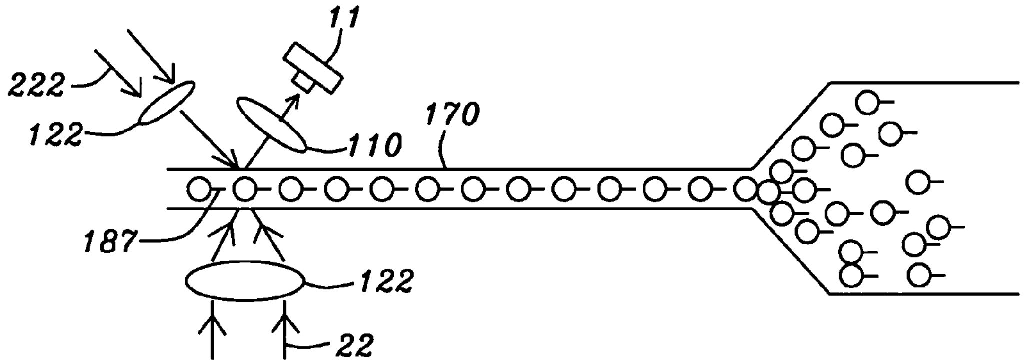
FIGS. 14A-14C are schematic illustrations showing three different embodiments of the invention corresponding to an optical detection system capable of detecting channeled labeled biological molecules.

Referring to FIG. 14A, there is shown schematically a process by which optical detection of the optical signal generated by the luminescent/fluorescent dyes attached to the biological cells or molecules is performed within the transport channel (170) of a structure (magnetic strips not shown) such as that shown schematically in FIG. 13A. The required excitation light ((22) from opposite side or (222) from same side as the detector (11)) to induce the response of the dye on an exemplary object (187) is passed through excitation optics (122) and illuminates a small section of the transport channel, which is transparent to the light. The size of the illuminated region is preferably no larger than a size in which at most two units could appear at the same time. The detection optics (110) transmits the optical signal from the illuminated region to a detector (11). Thus, when test units pass through the detection optics, signal peaks can be generated by the detector as discussed previously in FIG. 11B. The excitation and detection optics can also be partly or entirely constructed of fiber-optics elements.

Embodiment 5B

Figure 14B:
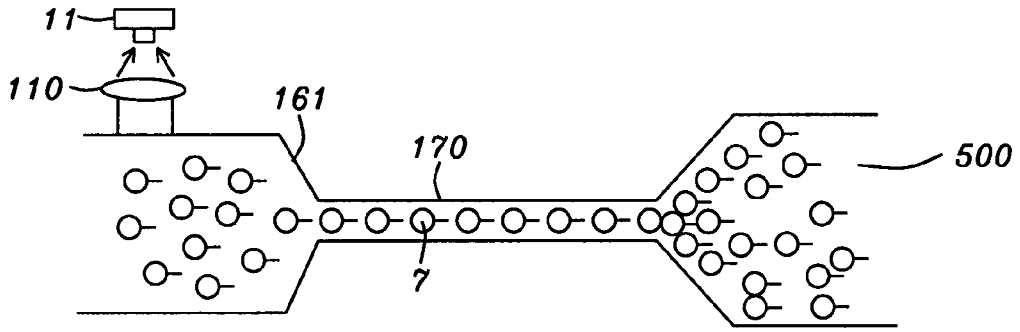

Referring to FIG. 14B, there is shown schematically test units (7) passing through the transport channel (170) and reappearing in a second collection pool (16). Subsequent to the arrival of the test units into pool (161), the emitted excitation light reaches the detector (11) from the illuminated collected units in the pool and an optical signal is received that can be correlated to the population of units in the pool. In this way, when a conventional 2D optical image of the sample pool (161) is taken, or an optical signal amplitude-to-population correlation is performed, existence and population of the target molecules or cells can be estimated without the interference of the sample solution and unbound optical dyes within the initial sample pool (500). In this method the units need not be transported individually through the channel (170).

Embodiment 5C

Figure 14C:
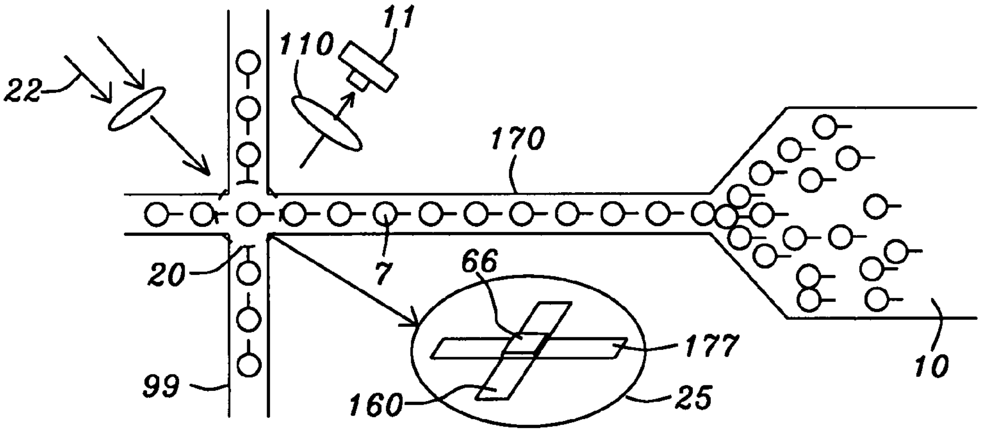

Referring to FIG. 14C, there is shown schematically a configuration wherein the region of optical detection is at an intersecting crossing (20) of different transport pathways (170) and (99). A trapping island (66), shown in inset (25), is formed by a patterned device (66) such as that in FIG. 12A under which are two electrical current paths (166), (177), which can magnetize the device in either of two different perpendicular directions. Different magnetically labeled biological entities can be labeled with different optical dyes. When transported into the island region, depending on the optical signal generated and detected by optics (110) and (11) as in FIG. 14B, different entities can both be counted and then can be shunted into different transport channels thereby achieving a sorting of the test units or a segregation of the units into separate pools.

As is finally understood by a person skilled in the art, the preferred embodiments of the present invention are illustrative of the present invention rather than limiting of the present invention. Revisions and modifications may be made to methods, materials, structures and dimensions employed in forming, providing and using an array of trapping/releasing patterned devices that can guide and transport magnetically and optically labeled cells and molecules so that they can be detected on an individual basis, while still forming, providing and using such an array in accord with the spirit and scope of the present invention as defined by the appended claims.

What is claimed is:

1. A device for guided transport of magnetically labeled entities comprising:

a substantially planar confining region, said region having a bottom surface and confining sides for confining a liquid solution containing mobile magnetically labeled entities, said confining region including at least one sample pool region and at least one concentrating region and wherein said at least one concentrating region guides said entities into at least one transport channel; and an array of discrete, patterned, layered thin film magnetic structures for transporting said magnetically labeled mobile entities within said confining region, wherein each said structure comprises three parallel layers, two of said layers having magnetic moments of substantially equal magnitude, being separated by a non-magnetic layer, wherein the magnetic moment of one layer is pinned in direction but wherein the magnetic moment of the other layer is free to move and can be changed in direction relative to that of the pinned layer from parallel to antiparallel by application of an electric current in a conducting line adjacent to said structure;

wherein said structures are formed beneath said bottom surface, each said structure having a length and a width and a horizontal cross-sectional shape having at least four edges and wherein at least two of said edges are parallel to each other and transverse to said transport channel and whose separation defines said width and wherein facing adjacent edges of immediately neighboring said structures are substantially parallel to each other and there is a uniform spacing therebetween; and a source of a variable external magnetic field that is directed substantially perpendicularly to the plane of said confining region wherein said magnetic field impinges upon said magnetic labels; and whereby trapping or releasing energy states of said magnetic labels are formed when said magnetic labels are between separated edges of adjacent layered structures in accord with relative directions of their magnetic moments combined with the effects of said external magnetic field on said magnetic labels;

whereby spatially sequential and temporally synchronized directional changes of said free layer magnetic moments produced by corresponding variations of said electric current flowing adjacent to each said structure within said array, when acting together with a temporally synchronized application of said external magnetic field produces a corresponding synchronous progression of said magnetic labels towards low energy states that transports said magnetically labeled mobile entities from said at least one holding pool region, through said at least one concentration region and, thereafter, on a single entity at a time basis, into said at least one transport channel.

2. The device of claim 1 wherein said entities also include optically excitable labels and wherein said device includes an optical detecting unit capable of exciting said labels with incident radiation and detecting the radiation emitted therefrom as said entities move past said optical detecting unit, in a one-at-a-time fashion implemented by said synchronous progression of trapping and release states, while guided and transported through said at least one transport channel.

3. The device of claim 2, wherein said optical detection of said labeled entity is by an optical signal generated by a luminescent or fluorescent dye attached to said entity, whereby a counting of the population of said entities can be performed by excitation and detection optics situated adjacent to said transport channel and focused on an area thereof preferably wherein said one-at-a-time motion occurs.

4. The device of claim 1 wherein said magnetic labels are superparamagnetic particles.

5. The device of claim 4 wherein a magnetization is induced in said particles by magnetic fields produced at an edge of said patterned magnetic structure or between parallel facing adjacent edges of adjacent patterned magnetic structures when a net amount of magnetic charge appears at said edge or between said edges.

6. The device of claim 5 wherein a local minimum of magnetostatic energy associated with the combined fields of said particles and said patterned magnetic structures produces a trapping state for said particles.

7. The device of claim 1 wherein said externally applied magnetic field induces a magnetization in said particle to predispose said particle to move towards a trapping state.

8. The device of claim 1, wherein each said patterned magnetic thin film structure comprises:

a first magnetic layer having parallel lateral edges directed in a first direction and having a magnetic moment that can be switched between two orientations along a second direction that is substantially perpendicular to said first direction;

a second magnetic layer formed identically to and coextensive with said first layer, said second layer having a magnetic moment that is pinned in one orientation along said second direction, a non-magnetic layer formed between and separating said first and second magnetic layers; wherein said first and second magnetic layers and said non-magnetic layer share a common horizontal cross-sectional shape that is rhombic, trapezoidal, rectangular or square; and a current carrying layer formed over said first layer or under said second layer and extending in said first direction.

9. The device of claim 8, wherein a current flowing in the layer plane of said current carrying layer in said first direction can produce a magnetic field in said second direction to switch a magnetic moment direction of said first layer.

10. The device of claim 9, wherein when said first layer magnetic moment is switched by the current field to be in the same direction as the magnetic moment of said second magnetic layer, said two magnetic layers produce a magnetic field at said lateral edges, which is of sufficient strength to attract said magnetic labels and trap them on said edges.

11. The device of claim 9, wherein when said first layer magnetic moment is switched by the current field to be in the opposite direction as the magnetic moment of said second magnetic layer the magnetic fields from the two magnetic layers cancel each other and produce an effective near zero magnetic field in said magnetic labels, whereby said labels are not trapped and can be released if they were trapped.

12. The device of claim 8, wherein said second layer magnetic moment is pinned by an adjacent antiferromagnetic layer, or by a synthetic antiferromagnetic structure or by an internal crystalline anisotropy.

13. The device of claim 1, wherein each said patterned magnetic thin film structure comprises:

a first magnetic layer having parallel lateral edges directed in a first direction and having a magnetic moment that can be switched between two orientations along a second direction that is perpendicular to said first direction;

a second magnetic layer formed identically to and coextensive with said first layer, said second layer having a magnetic moment that is pinned in one orientation along said second direction, a non-magnetic layer formed between and separating said first and second magnetic layers and serving as a current carrying layer; wherein said three layers have a common horizontal cross-sectional shape.

14. The device of claim 13 wherein said common cross-sectional shape is rhombic, trapezoidal or rectangular.

15. The device of claim 1 wherein each of said patterned, layered thin film magnetic structures is formed of two layers, wherein each of said two layers has a width and a length, wherein a first of said two layers is a magnetic strip that, when no current induced magnetic field is present, has a magnetic moment directed along a lengthwise direction and a second of said two layers is a current carrying layer formed thereon.

16. The device of claim 15, wherein said lengthwise direction of said magnetic layer magnetic moment is maintained by an antiferromagnetic layer, or by a synthetic antiferromagnetic structure, or by an internal crystalline anisotropy, or by a shape anisotropy.

17. The device of claim 15, wherein a current in said current carrying layer flowing in said lengthwise direction is able to produce a current induced magnetic field to rotate said magnetic moment in said magnetic strip from said lengthwise direction substantially into a perpendicular direction thereto, which is the widthwise direction.

18. The device of claim 17, wherein a rotation of said magnetic moment in said magnetic strip into said widthwise direction by said current induced magnetic field produces an effective magnetic field at said lateral edges which is of sufficient strength to attract said magnetic labels and trap them at said edges.

19. The device of claim 17, wherein removing said current induced field allows said magnetic moment of said magnetic strip to revert to said lengthwise direction, thereby producing an effectively near zero magnetic field in said magnetic labels and releasing said labels.

20. The device of claim 1 wherein each of said patterned, layered thin film magnetic structures is formed of two layers, wherein each layer has a width and a length and wherein a first layer is a magnetic strip having a magnetic moment directed along a widthwise direction and wherein a second layer is a current carrying layer formed thereon and capable of carrying a current in a lengthwise direction.

21. The device of claim 20, wherein the current flowing in said current carrying layer in said length direction is able to produce a magnetic field to switch the magnetic moment of said magnetic strip between the two orientations along the width direction.

22. The device of claim 20, wherein said magnetic moment of said magnetic strip in said width direction is maintained by an antiferromagnetic layer, or by a synthetic antiferromagnetic structure common used in magneto-resistive heads, or by an internal crystalline anisotropy, or by a shape anisotropy, or by the field produced by the electrical current.

23. The device of claim 20, wherein switching the orientation of said magnetic strip magnetic moment by the current field of said current carrying layer to an orientation that is opposite to the orientation of the magnetic moment of the magnetic layers of neighboring patterned magnetic devices, produces an effective magnetic field that is of sufficient strength to attract the magnetic labels and trap them in a low energy trapping state formed at the lateral edge of said magnetic layer.

24. The device of claim 23, wherein restoring said reversed magnetic strip magnetic moment to the orientation of all other neighboring magnetic layers by reversing said current, said edge field at the edge of said layer having said restored magnetic moment is rendered effectively zero and the low energy trapping state is removed and said trapped label is released.

25. The device of claim 1, wherein said at least one transport channel is a confining region having a width that is smaller than twice the largest entity to be transported along the channel to assist single object transport enabled by said synchronous progression of states or does not have a physical confinement structure but is defined by the length of the patterned thin film structure, which is short enough to allow only one object transport at a time.

* * * * *